United States Patent
Zhong et al.

(10) Patent No.: US 10,463,218 B2
(45) Date of Patent: Nov. 5, 2019

(54) CHARGING STAND FOR VACUUM CLEANER

(71) Applicant: JIANGSU MIDEA CLEANING APPLIANCES CO., LTD., Suzhou, Jiangsu (CN)

(72) Inventors: Min Zhong, Jiangsu (CN); Chaoyi Deng, Jiangsu (CN); Xinzhou Wang, Jiangsu (CN); Yonghua Wang, Jiangsu (CN)

(*) Notice: Subject to any disclaimer, the term of this patent is extended or adjusted under 35 U.S.C. 154(b) by 448 days.

(21) Appl. No.: 15/356,501

(22) Filed: Nov. 18, 2016

(65) Prior Publication Data

US 2017/0202420 A1     Jul. 20, 2017

(30) Foreign Application Priority Data

| Jan. 20, 2016 | (CN) | .......................... 2016 1 0036807 |
| Jan. 20, 2016 | (CN) | .......................... 2016 1 0036808 |
| Jan. 20, 2016 | (CN) | .......................... 2016 1 0036810 |
| Jan. 20, 2016 | (CN) | .......................... 2016 1 0037447 |
| Jan. 20, 2016 | (CN) | .......................... 2016 1 0037459 |
| Jan. 20, 2016 | (CN) | .......................... 2016 1 0037564 |
| Jan. 20, 2016 | (CN) | ..................... 2016 2 0054592 U |
| Jan. 20, 2016 | (CN) | ..................... 2016 2 0054593 U |

(Continued)

(51) Int. Cl.
*A47L 5/30*       (2006.01)
*H02J 7/00*       (2006.01)
(Continued)

(52) U.S. Cl.
CPC .............. *A47L 9/2873* (2013.01); *A47L 5/30* (2013.01); *A47L 9/0477* (2013.01);
(Continued)

(58) Field of Classification Search
CPC ........ A47L 9/2873; A47L 9/0477; A47L 5/30; A47L 2201/024; A47L 2201/02;
(Continued)

(56) References Cited

U.S. PATENT DOCUMENTS

| 2009/0229075 A1 | 9/2009 | Eriksson |
| 2014/0143978 A1 | 5/2014 | Li et al. |
| 2014/0366300 A1 | 12/2014 | Eriksson |

FOREIGN PATENT DOCUMENTS

| CN | 102334943 A | 2/2012 |
| CN | 103505152 A | 1/2014 |

(Continued)

OTHER PUBLICATIONS

China Paten Office, Office action dated Jul. 20, 2018 for CN application 201610037447.5.
(Continued)

*Primary Examiner* — David Redding
(74) *Attorney, Agent, or Firm* — Kilpatrick Townsend & Stockton, LLP

(57) ABSTRACT

A charging stand (100) for a vacuum cleaner (200) includes a body (1), a pedal (2) and a safety protection device (3). The pedal (2) is disposed to the body (1) and is pivotable between a first position and a second position. The safety protection device (3) is disposed to the body (1), normally cooperate with the pedal (2), and separate from cooperation with the pedal (2) to make the pedal (2) move from the first position to the second position when moved.

26 Claims, 12 Drawing Sheets

(30) Foreign Application Priority Data

| | | | |
|---|---|---|---|
| Jan. 20, 2016 | (CN) | ..................... | 2016 2 0054761 U |
| Jan. 20, 2016 | (CN) | ..................... | 2016 2 0054838 U |
| Jan. 20, 2016 | (CN) | ..................... | 2016 2 0054864 U |
| Jan. 20, 2016 | (CN) | ..................... | 2016 2 0054926 U |
| Jan. 20, 2016 | (CN) | ..................... | 2016 2 0054929 U |

(51) Int. Cl.
    *A47L 9/04*     (2006.01)
    *B26D 1/00*     (2006.01)
    *A47L 9/28*     (2006.01)

(52) U.S. Cl.
    CPC .......... *B26D 1/0006* (2013.01); *H02J 7/0027* (2013.01); *H02J 7/0044* (2013.01); *A47L 2201/02* (2013.01); *A47L 2201/024* (2013.01); *B26D 2001/006* (2013.01)

(58) Field of Classification Search
    CPC ............. B26D 1/0006; B26D 2001/006; H02J 7/0044; H02J 7/0027
    USPC .......................................................... 15/323
    See application file for complete search history.

(56) References Cited

FOREIGN PATENT DOCUMENTS

| | | |
|---|---|---|
| CN | 203619467 U | 6/2014 |
| CN | 104080384 A | 10/2014 |
| CN | 205458450 U | 8/2016 |
| CN | 205514367 U | 8/2016 |
| CN | 205514380 U | 8/2016 |
| CN | 205514399 U | 8/2016 |
| CN | 205514400 U | 8/2016 |
| CN | 205514401 U | 8/2016 |
| JP | 2010125009 A | 6/2010 |
| JP | 2015506763 A | 3/2015 |
| WO | 2013113395 A1 | 8/2013 |

OTHER PUBLICATIONS

Office action from EPO for EP application 16172368.
Office action from JPO for JP application 2016117358.
Office action from SIPO for CN application 201610037447.5.
Office action from SIPO for CN application 201610037459.8.
Office action from SIPO for CN application 201610037564.1.
Office action from SIPO for CN application 201610036808.4.
Office action from SIPO for CN application 201610036807.X.
Office action from SIPO for CN application 201610036810.1.
English translation of office action from JPO for JP application 2016117358.
English translation of office action from SIPO for CN application 201610037447.5.
English translation of office action from SIPO for CN application 201610037459.8.
English translation of office action from SIPO for CN application 201610037564.1.
English translation of office action from SIPO for CN application 201610036808.4.
English translation of office action from SIPO for CN application 201610036807.X.
English translation of office action from SIPO for CN application 201610036810.1.

CHARGING STAND FOR VACUUM CLEANER

CROSS-REFERENCE TO RELATED APPLICATION

This application claims priority to and benefits of Chinese Patent Application Serial No. 201610036808.4, filed with the State Intellectual Property Office of P. R. China on Jan. 20, 2016, Chinese Patent Application Serial No. 201610036807.X filed with the State Intellectual Property Office of P. R. China on Jan. 20, 2016, Chinese Patent Application Serial No. 201620054864.6, filed with the State Intellectual Property Office of P. R. China on Jan. 20, 2016, Chinese Patent Application Serial No. 201620054593.4, filed with the State Intellectual Property Office of P. R. China on Jan. 20, 2016, Chinese Patent Application Serial No. 201610037564.1, filed with the State Intellectual Property Office of P. R. China on Jan. 20, 2016, Chinese Patent Application Serial No. 201620054926.3, filed with the State Intellectual Property Office of P. R. China on Jan. 20, 2016, Chinese Patent Application Serial No. 201620054929.7, filed with the State Intellectual Property Office of P. R. China on Jan. 20, 2016, Chinese Patent Application Serial No. 201620054592.X, filed with the State Intellectual Property Office of P. R. China on Jan. 20, 2016, Chinese Patent Application Serial No. 201620054761.X, filed with the State Intellectual Property Office of P. R. China on Jan. 20, 2016, Chinese Patent Application Serial No. 201610036810.1, filed with the State Intellectual Property Office of P. R. China on Jan. 20, 2016, Chinese Patent Application Serial No. 201610037447.5, filed with the State Intellectual Property Office of P. R. China on Jan. 20, 2016, Chinese Patent Application Serial No. 201620054838.3, filed with the State Intellectual Property Office of P. R. China on Jan. 20, 2016, and Chinese Patent Application Serial No. 201610037459.8, filed with the State Intellectual Property Office of P. R. China on Jan. 20, 2016, the entire contents of which are incorporated herein by reference.

FIELD

The present disclosure relates to a technical field of vacuum cleaners, and more particularly to a charging stand for a vacuum cleaner.

BACKGROUND

In the related art, a charging stand for charging a rechargeable vacuum cleaner has a single function, i.e. charging function.

SUMMARY

The present disclosure seeks to solve at least one of problems existing in the prior art. Therefore, an objective of the present disclosure is to provide a charging stand for a vacuum cleaner, in which a pedal can be effectively prevented from moving to a second position when at least one safety protection device cooperates with the pedal.

The charging stand according to the present disclosure includes a body; a pedal, disposed to the body and pivotable between a first position and a second position; and a safety protection device, disposed to the body, normally cooperating with the pedal, and separating from cooperation with the pedal to make the pedal move from the first position to the second position when moved.

For the charging stand according to the present disclosure, the pedal can be effectively prevented from moving to the second position when the safety protection device cooperates with the pedal, by providing the pivotable pedal and the safety protection device.

According to one embodiment of the present disclosure, at least two safety protection devices are provided, the at least two safety protection devices are disposed to the body and spaced apart from one another, and the at least two safety protection devices separate from the cooperation with the pedal to make the pedal move from the first position to the second position when moved.

According to one embodiment of the present disclosure, the safety protection device includes: a safety protection member, disposed at a side of the pedal and having a cooperating groove for cooperating with an edge of the pedal; and a resetting member, disposed between the safety protection member and the body, and configured to normally push the safety protection member in a direction facing the center of the pedal.

According to one embodiment of the present disclosure, the safety protection member is pivotably connected to the body, and has a first end and a second end; the cooperating groove is formed in the second end of the safety protection member; the second end of the safety protection member moves towards a direction away from the center of the pedal when the first end of the safety protection member is moved, to make the edge of the pedal separate from cooperation with the cooperating groove.

According to one embodiment of the present disclosure, the first end of the safety protection member has a guide face for pressing the first end of the safety protection member.

According to one embodiment of the present disclosure, the guide face is configured to obliquely extend from the top down and towards the center of the pedal.

According to one embodiment of the present disclosure, the guide face is formed as an inclined plane or an inclined curved surface that obliquely extends from the top down and towards to the center of the pedal.

According to one embodiment of the present disclosure, the first end of the safety protection member stretches out from an internal side surface of the body when the pedal is located at the first position.

According to one embodiment of the present disclosure, the resetting member is a resilient sheet or a spring.

According to one embodiment of the present disclosure, two safety protection devices are provided and located at a left side and a right side of the body, respectively.

According to one embodiment of the present disclosure, the pedal is horizontally disposed when located at the first position.

According to one embodiment of the present disclosure, a represents a rotational angle of the pedal rotating from the first position to the second position, wherein α satisfies 0 degree<α≤60 degrees.

According to one embodiment of the present disclosure, α further satisfies 1 degree≤α≤10 degrees.

According to one embodiment of the present disclosure, the body has an open top, and the pedal is disposed in the body and spaced apart from a bottom wall of the body.

According to one embodiment of the present disclosure, a lower surface of the pedal is provided with at least one reinforcing rib.

According to one embodiment of the present disclosure, a blade is disposed in the body, and the pedal has an opening formed in a position corresponding to the blade. The blade stretches out from the opening when the pedal is located at the second position to cut off hairs on a brush roll in the vacuum cleaner placed on the pedal, and the blade is located under the opening when the pedal is located at the first position.

According to one embodiment of the present disclosure, the charging stand for the vacuum cleaner further includes a microswitch, disposed in the body, and triggered when the pedal is located at the second position to make the charging stand stop charging and the brush roll rotate.

According to one embodiment of the present disclosure, the blade is vertically disposed.

According to one embodiment of the present disclosure, the blade extends in a curve way along a length direction of the blade.

According to one embodiment of the present disclosure, the blade extends in an arc way or a waved way along a length direction of the blade.

According to one embodiment of the present disclosure, the body has a base, and an elastic member is disposed between the blade and the base.

According to one embodiment of the present disclosure, the charging stand further includes a blade holder, disposed to the base, wherein the blade is disposed on the blade holder, and the elastic member is disposed between the blade and the blade holder and/or between the blade holder and the base.

According to one embodiment of the present disclosure, a receiving groove used for receiving the elastic member is formed in the base when the elastic member is disposed between the blade holder and the base.

According to one embodiment of the present disclosure, an upper surface of the elastic member is higher than an upper surface of the base.

According to one embodiment of the present disclosure, the elastic member is soft rubber. According to one embodiment of the present disclosure, the pedal is provided with a baffle sheet, and the opening is formed in the baffle sheet.

According to one embodiment of the present disclosure, the baffle sheet is horizontally disposed.

According to one embodiment of the present disclosure, a clearance groove is formed in a lower surface of a portion, close to the opening, of the baffle sheet.

According to one embodiment of the present disclosure, an internal wall of the clearance groove is configured to have a distance from an upper surface of the baffle sheet decreased gradually in a direction facing the opening.

According to one embodiment of the present disclosure, the baffle sheet is a soft rubber baffle sheet.

According to one embodiment of the present disclosure, the pedal has a first end and a second end, and the first end of the pedal is pivotably connected to the body by a pivot; an elastic resetting member is disposed between the second end of the pedal and the body, and configured to normally push the pedal in a direction facing the first position.

According to one embodiment of the present disclosure, a limiting member is provided at a side, close to the second end of the pedal, of the body, and the limiting member is located at a side, away from the elastic resetting member, of the pedal.

According to one embodiment of the present disclosure, the elastic resetting member is a spring.

According to one embodiment of the present disclosure, the pedal extends along a front and rear direction, the first end of the pedal is a rear end of the pedal, and the second end of the pedal is a front end of the pedal.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other additional aspects and advantages of embodiments of the present disclosure will become apparent and more readily appreciated from the following descriptions made with reference to the drawings, in which.

Figure 1:
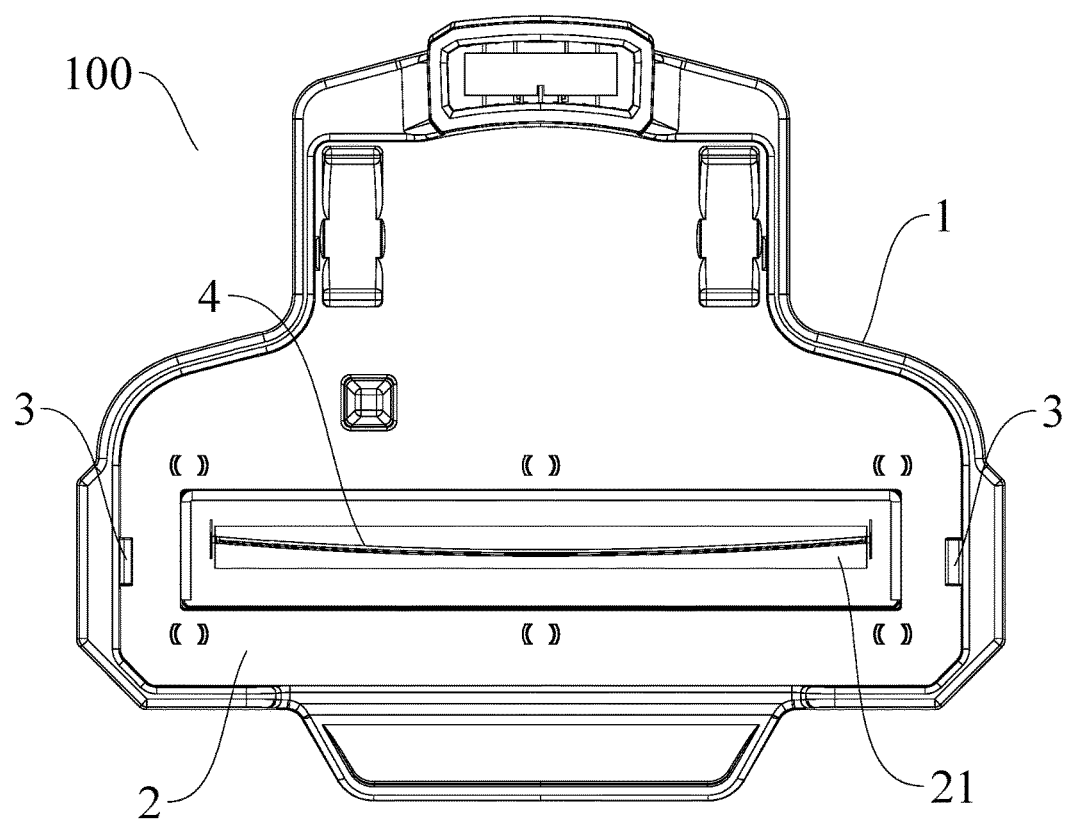
FIG. 1 is a top view of a charging stand for a vacuum cleaner according to an embodiment of the present disclosure.

REFERENCE NUMERALS 100 charging stand 1 body; 11 base; 111 receiving groove; 2 pedal; 21 opening; 22 pivot; 23 elastic resetting member; 24 limiting member; 25 reinforcing rib; 26 baffle sheet; 261 clearance groove; 3 safety protection device; 31 safety protection member; 311 cooperating groove; 32 resetting member; 4 blade; 41 blade holder; 42 elastic member; 5 microswitch;

200 vacuum cleaner; 201 brush roll; 202 brush roll boss.

DETAILED DESCRIPTION

Reference will be made in detail to embodiments of the present disclosure, where the same or similar elements and the elements having the same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it is to be understood that terms such as "center", "longitudinal", "transverse", "length," "width," "thickness," "upper," "lower," "front," "rear," "left," "right," "vertical," "horizontal," "top," "bottom," "inner," "outer", "clockwise", "counterclockwise", "axial", "radial" and "circumferential" should be construed to refer to the orientation as then described or as shown in the drawings under discussion. These relative terms are for convenience of description and do not require that the present disclosure be constructed or operated in a particular orientation, thus shall not be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the description of the present disclosure, it should be understood that, unless specified or limited otherwise, the terms "mounted", "supported", "connected" and "coupled" and variations thereof are used broadly and encompass such as permanent connection, detachable connection, or integrally connection; mechanical or electrical mountings, connections and couplings; direct connection or indirect connection via intermediary; also can be inner mountings, connections and couplings of two components, which can be understood by those skilled in the art according to the detail embodiment of the present disclosure.

In the present invention, unless specified or limited otherwise, a first feature disposed "above" or "below" a second feature may include the first and second features are in direct contact, and may also include the first and second features are in contact not directly but through an additional feature between them. Further, the first feature located "above", "top" and "upper" the second features includes the first feature located directly and/or obliquely above the second feature, or simply represents a horizontal height of the first feature is more than that of the second feature. The first feature located "under", "below" and "lower" the second feature includes the first feature located directly and/or obliquely below the second feature, or simply represents a horizontal height of the first feature is less than that of the second feature.

In the following, a charging stand 100 for a vacuum cleaner 200 according to embodiments of the present disclosure will be described with reference to FIG. 1 to FIG. 16. The charging stand 100 may charge the vacuum cleaner 200, such as a rechargeable vacuum cleaner.

As shown in FIG. 1 to FIG. 16, the charging stand 100 for the vacuum cleaner 200 according to embodiments of the present disclosure includes a body 1, a pedal 2 and a safety protection device 3.

A blade 4 is provided in the body 1 and may cut off hairs and the like on a brush roll 201 of the vacuum cleaner 200 placed on the charging stand 100. In such a case, the charging stand 100 not only has a charging function, but also can clear up hairs wound around the brush roll 201, so as to extend the function of the charging stand 100, facilitate the cleaning of the brush roll 201, and simplify a process of cleaning the brush roll 201. Herein, it should be noted that the vacuum cleaner 200 may be a rechargeable vacuum cleaner or a vacuum cleaner 200 of another type, when the charging stand 100 is used for cleaning.

Figure 2:
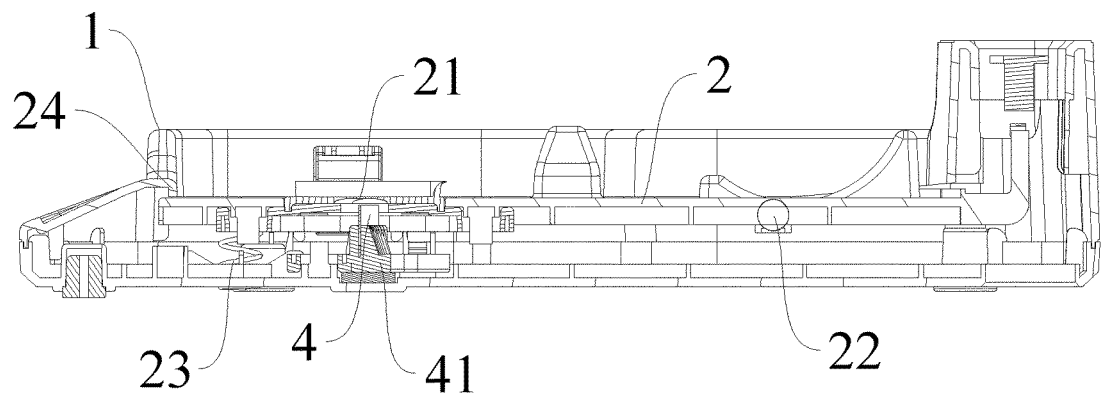
FIG. 2 is a longitudinal sectional view of the charging stand according to the embodiment of the present disclosure, wherein a pedal is located at a first position.
Figure 3:
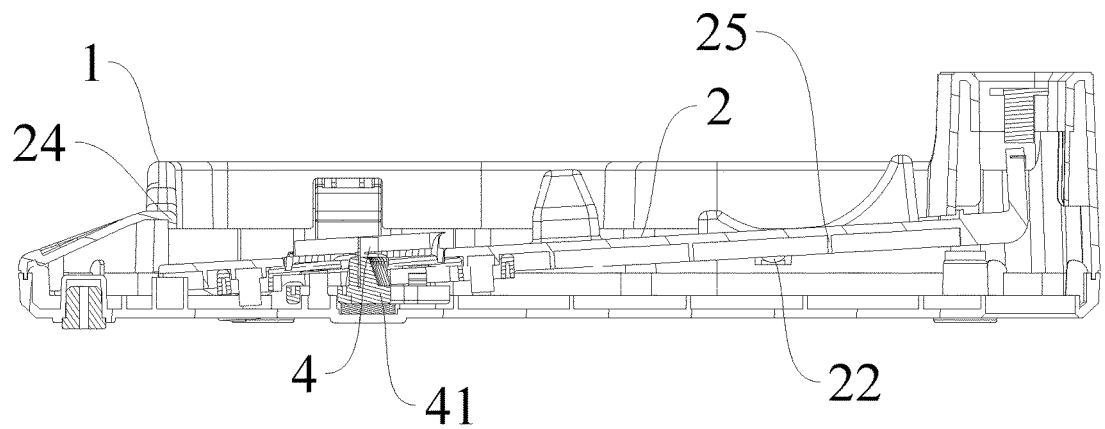
FIG. 3 is a longitudinal sectional view of the charging stand according to the embodiment of the present disclosure, wherein the pedal is located at a second position.

The pedal 2 is disposed to the body 1 and is pivotable between a first position and a second position. The pedal 2 has an opening 21 formed in a position corresponding to the blade 4. The blade 4 is under the opening 21 when the pedal 2 is located at the first position (as shown in FIG. 2), and the blade 4 stretches out from the opening 21 when the pedal 2 is located at the second position (as shown in FIG. 3). When the pedal 2 is located at the first position, the blade 4 is received in the body 1 and is not exposed from the opening 21, and at the moment the rechargeable vacuum cleaner can be placed on the charging stand 100 to be charged, which guarantees the safety of using the charging stand 100. When the pedal 2 is located at the second position, the blade 4 stretches out from the opening 21, and at the moment the vacuum cleaner 200 is started to make the brush roll 201 rotate, such that the blade 4 may effectively cut off hairs and the like wound around the brush roll 201.

One or more safety protection devices 3 may be provided. The safety protection device 3 is disposed to the body 1 when one safety protection device is provided, and the safety protection device 3 cooperates with the pedal 2 normally. The safety protection device 3 separates from the cooperation with the pedal 2 to make the pedal 2 move from the first position to the second position, when moved.

At least two safety protection devices 3 are disposed to the body 1 and spaced apart from one another when a plurality of safety protection devices 3 are provided, and each safety protection device 3 cooperates with the pedal 2 normally. The at least two safety protection devices 3 separate from the cooperation with the pedal 2 to make the pedal 2 move from the first position to the second position, when moved. The safety protection device 3 usually keeps the cooperation with the pedal 2 to make the pedal 2 remain at the first position, that is, the blade 4 kept in the body 1, so as to effectively avoid the safety hazard that a user may be hurt by the exposed blade 4 if the pedal 2 directly moves to the second position. Furthermore, all the safety protection devices 3 need to be pushed at the same time when the hairs on the brush roll 201 need cutting, to make all the safety protection devices 3 separate from the cooperation with the pedal 2, such that the pedal 2 is released and then rotated to the second position to expose the blade 4 so as to cut off hairs on the brush roll 201. In the above process, if only some of the safety protection devices 3 are pushed, the pedal 2 still cannot move to the second position, so the user's safety can be further guaranteed during usage.

The function of the charging stand 100 of the vacuum cleaner 200 according to embodiments of the present disclosure is extended by providing the blade 4 in the body 1, and the safety of using the charging stand 100 can be effectively guaranteed by providing the pivotable pedal 2 and the at least two safety protection devices 3.

According to one embodiment of the present disclosure, the pedal 2 is horizontally disposed while located at the first position as shown in FIG. 2, so the charging stand 100 has a whole beautiful appearance, and the rechargeable vacuum cleaner can be horizontally placed on the pedal 2 during the charging. A front end of the pedal 2 at the second position is lower compared with the front end of the pedal 2 at the first position, as shown in FIG. 3. The pedal 2 may be moved to the second position just by stepping the pedal 2 down, so as to provide great convenience for the user. Herein, it should be noted that the word "front" means a direction of the charging stand 100 close to the user, and the opposite direction is defined as "rear".

α represents a rotation angle of the pedal 2 rotating from the first position to the second position, in which α satisfies 0 degree<α≤60 degrees. For example, a may be 30 degrees. Furthermore, a further satisfies 1 degree≤α≤10 degrees. For example a may be 3 degrees or 5 degrees. Understandably, the specific value of a can be adaptively changed according to actual needs, and α is specifically defined in the present disclosure.

An upper end of the blade 4 is preferably lower than a lower surface of the pedal 2 when the pedal 2 is located at the first position. Of course, the upper end of the blade 4 may be higher than the lower surface of the pedal 2 and lower than an upper surface of the pedal 2 (not shown in the drawings).

Figure 7:
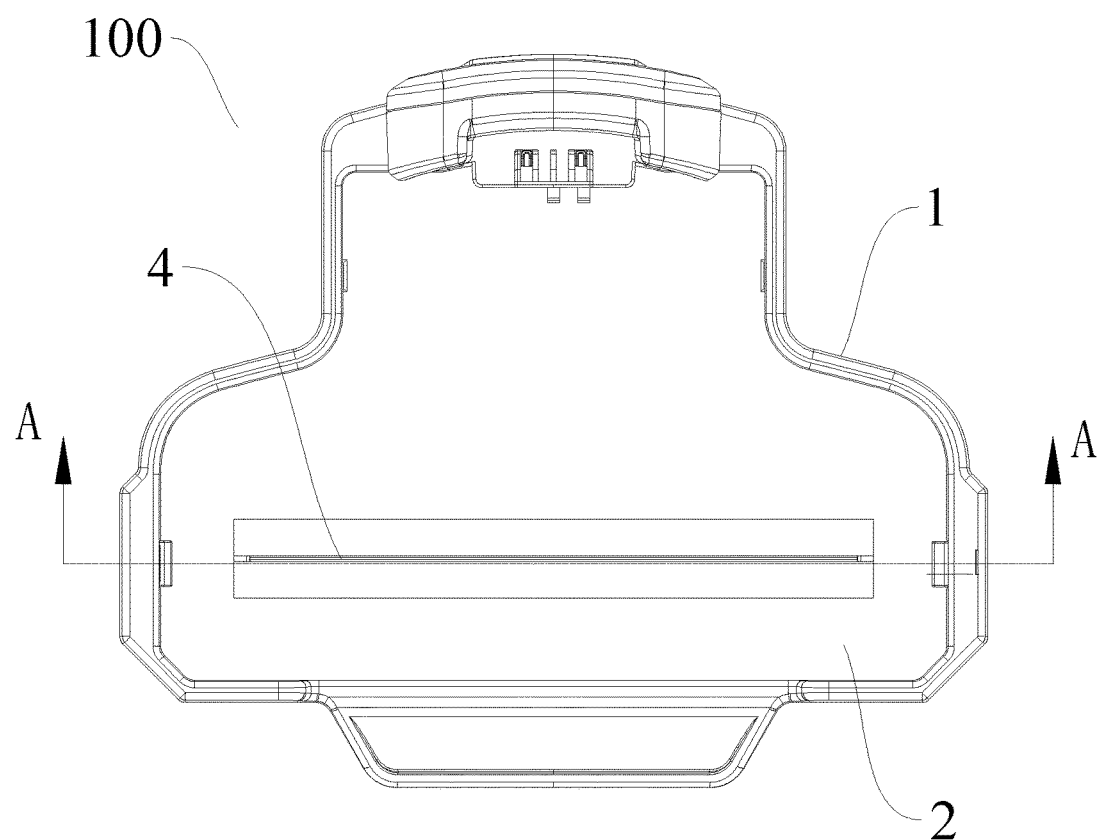
FIG. 7 is a top view of a charging stand for a vacuum cleaner according to another embodiment of the present disclosure.

As shown in FIG. 1 and FIG. 7, the opening 21 extends in a left and right direction, a length direction of the blade 4 is the same as the above extension direction, and the length direction of the blade 4 is the same as that of the brush roll 201, so the blade 4 can fully cut off the hairs on the brush roll 201.

Optionally, the blade 4 linearly extends along the length direction thereof, as shown in FIG. 7, so the blade 4 is easy to machine at a low cost. Of course, the blade 4 may also extend in a curve way along the length direction of the blade 4, so as to ensure the stability of the blade 4 in the hair cutting process and achieve a better hair cutting effect. For example, the blade 4 extends in an arc way along the length direction thereof. For example, referring to FIG. 1, in combination with FIG. 11 to FIG. 13, the blade 4 is bent towards a direction away from the center of the body 1. Specifically, the blade 4 is bent towards a direction close to a center of the brush roll 201 while deviating a central axis of the brush roll 201, so as to better cut off the hairs wound around the brush roll 201. Of course, the blade 4 also may extend in a waved way along the length direction of the blade 4 (not shown in the drawings), in which case the stability of the blade 4 can also be ensured in the hair cutting process, and the blade 4 is hard to deform.

Figure 13:
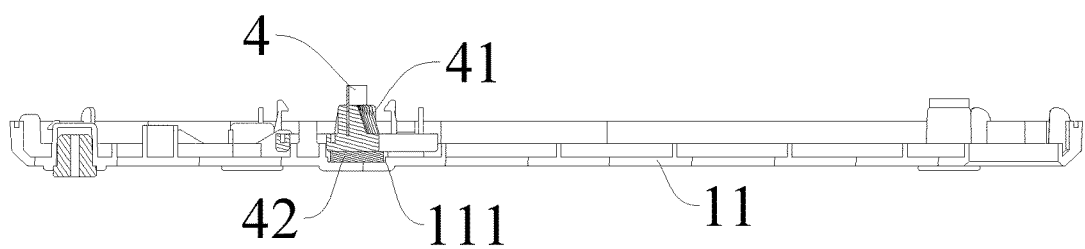
FIG. 13 is a partial schematic view of the charging stand according to the embodiment of the disclosure.
Figure 14:
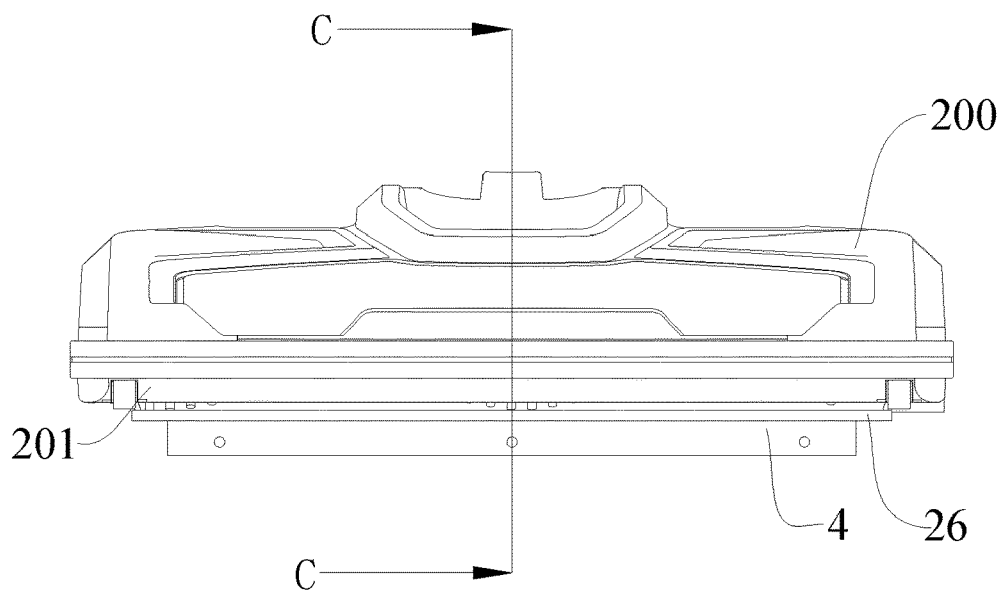
FIG. 14 is a schematic view of the vacuum cleaner, a baffle sheet and the blade according to the embodiment of the disclosure.

As shown in FIG. 13, the body 1 has a base 11, the blade 4 is disposed to the base 11 and used for cutting the hairs wound around the brush roll of the vacuum cleaner. In the hair cutting process, the upper end of the blade 4 is in contact with a brush roll boss 202 (not shown in the drawings) on the brush roll, so as to cut off hairs wound around the brush roll boss 202. The vacuum cleaner here may be the rechargeable vacuum cleaner or the vacuum cleaner of another types.

Referring to FIG. 13, an elastic member 42 is disposed between the blade 4 and the base 11. Optionally, the elastic member 42 is but not limited to soft rubber. Therefore, during a working process of the charging stand 100, a height of the blade 4 can be automatically adjusted by the elastic member 42 when an interference fit between the blade 4 and the brush roll boss 202 in rotation is overmuch, to prevent the blade 4 from excessive contact with the brush roll boss 202, so as to greatly reduce positional accuracy of the blade 4, reduce the cost and raise the qualified rate of products.

According to some embodiments of the present disclosure, as shown in FIG. 13, the charging stand 100 further includes a blade holder 41 disposed to the base 11, in which the blade 41 may be disposed to an internal wall of the base 11 (for example, a bottom wall in FIG. 2). The blade 4 is disposed to the blade holder 41, and for example, the blade 4 may be inserted in the blade holder 41. Therefore, the blade 4 can be conveniently and firmly mounted to the base 11 by providing the blade holder 41. Preferably, the blade 4 is vertically disposed, so as to effectively cut off hairs wound around the brush roll.

The elastic member 42 is disposed between the blade 4 and the blade holder 41 and/or between the blade holder 41 and the base 11. Specifically, the elastic member 42 may be only disposed between the blade 4 and the blade holder 41, or may be only disposed between the blade holder 41 and the base 11, or may be disposed between the blade 4 and the blade holder (41) and also between the blade holder 41 and the base 11 at the same time. For example, referring to FIG. 13, the elastic member 42 is disposed between the blade holder 41 and the base 11, and an upper end of the elastic member 42 is connected to a lower end of the blade holder 41.

Specifically, an receiving groove 111 used for receiving the elastic member 42 is formed in the base 11 when the elastic member 42 is disposed between the blade holder 41 and the base 11. Referring to FIG. 13, the receiving groove 111 may be formed by a concave portion, dented towards a direction away from the center of the basel 1, of the internal wall of the base 11. Accordingly, the elastic member 42 can be conveniently mounted and dismounted, and be stable in position, so that the whole performance of the charging stand 100 can be raised.

Optionally, an upper surface of the elastic member 42 is higher than that of the base 11. Referring to FIG. 13, the upper surface of the elastic member 42 is higher than a bottom wall of the base 11. Accordingly, the height of the bade 4 is convenient to adjust.

A baffle sheet 26 is disposed to the pedal 2 and has an opening 21 formed therein. For example, referring to FIGS. 14 to 16, the baffle sheet 26 is preferably disposed close to and under a ground brush opening of the vacuum cleaner 200, in which case a distance between the baffle sheet 26 and the ground brush opening is small. Accordingly, the cut hairs thrown away from the brush roll 2 fall on the baffle sheet 26 in the hair cutting process, rather than go beyond a vacuuming scope of the vacuum cleaner 200, so as to prevent secondary pollution caused by the cut hairs thrown away out of the vacuuming scope of the vacuum cleaner 200.

Figure 15:
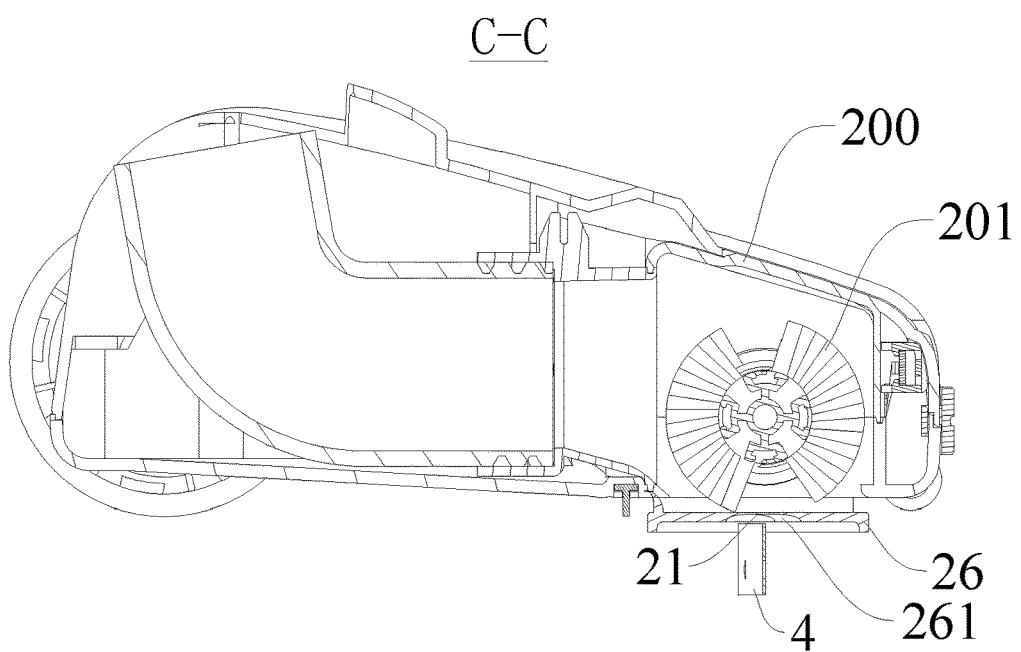
FIG. 15 is a sectional view taken along line C-C in FIG. 14.
Figure 16:
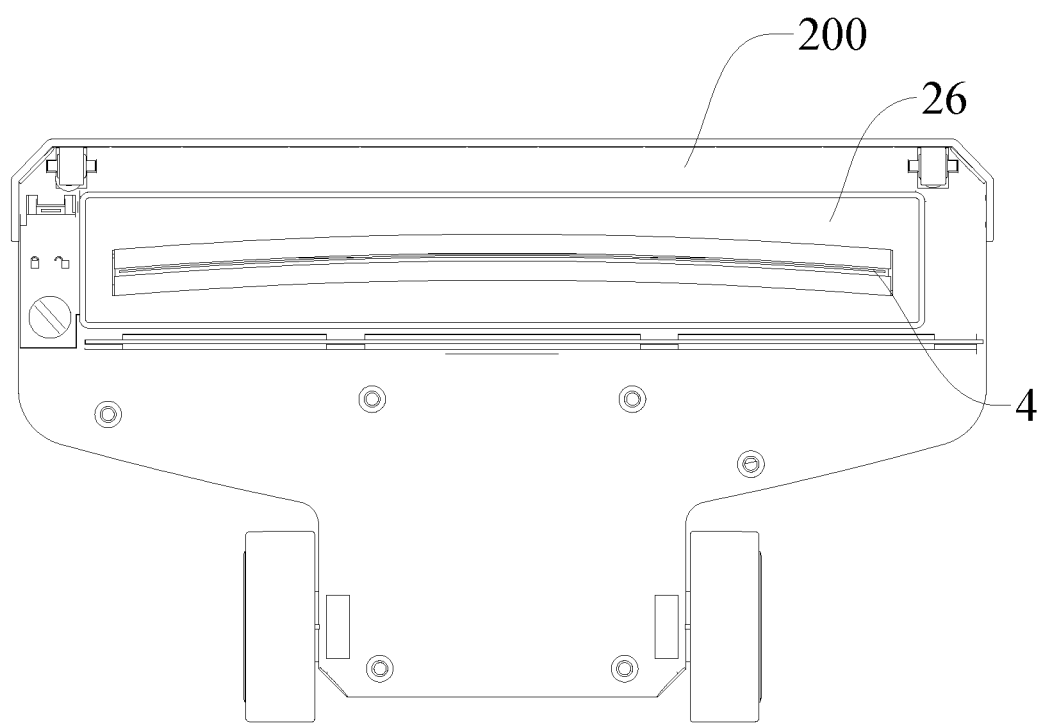
FIG. 16 is a bottom view of the vacuum cleaner, the baffle sheet and the blade shown in FIG. 14.

Optionally, the baffle sheet 26 is horizontally disposed. Accordingly, the hairs falling on the baffle sheet 26 can be prevented from concentrated distribution, so that the vacuum cleaner 200 can conveniently suck the hairs on the baffle sheet 26 into a dust cup to improve the vacuuming efficiency. In addition, materials can be saved, and cost of the materials can be reduced. As shown in FIG. 15, a clearance groove 261 is formed in a lower surface of a portion, close to the opening 21, of the baffle sheet 26. Furthermore, an internal wall of the clearance groove 261 is configured to have a distance from an upper surface of the baffle sheet 26 decreased gradually in a direction facing the center of the opening 21. That is, a portion, close to the opening 21, of the pedal 2 has a thickness gradually reduced in a direction facing the opening 21. Accordingly, the blade 4 can be prevented from touching the baffle sheet 26, and thus the service life of the baffle sheet 26 is prolonged, and usage cost is reduced. Optionally, the baffle sheet 26 may be but not limited to a soft rubber baffle sheet. For example, the baffle sheet 26 may be a hard plastic baffle sheet and the like, as long as the hairs thrown away from the brush roll 201 fall within the vacuuming scope of the vacuum cleaner 200, so the baffle sheet is not specifically defined in the present disclosure.

Figure 10:
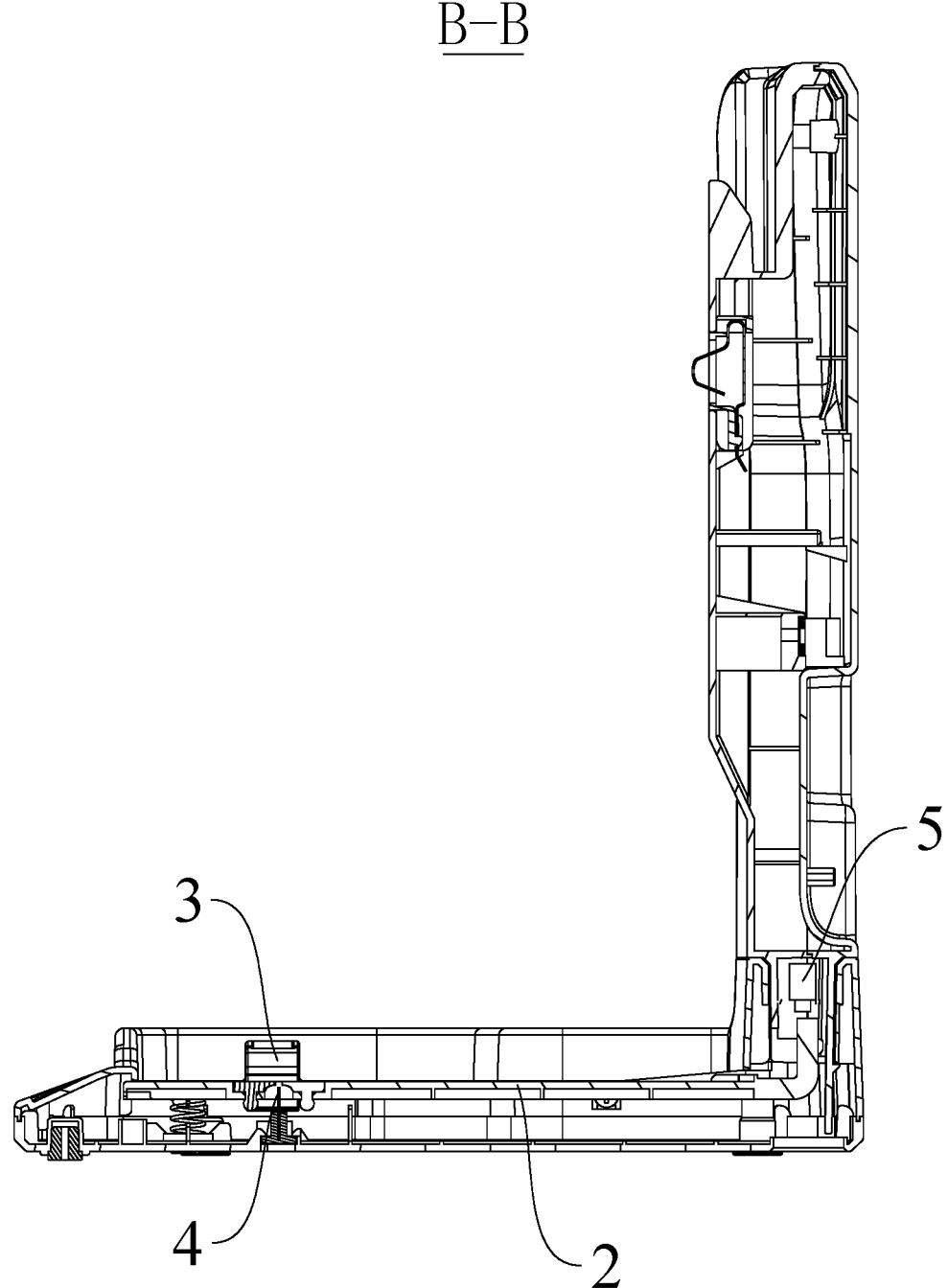
FIG. 10 is a sectional view taken along line B-B in FIG. 9.
Figure 11:
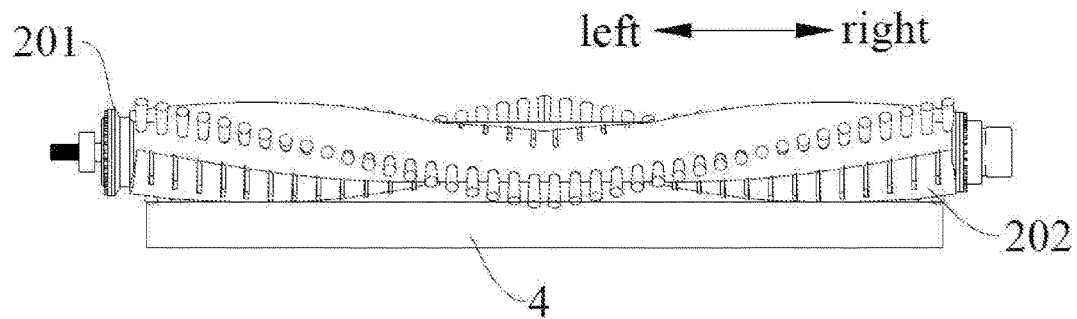
FIG. 11 is a structural schematic view of a blade and a brush roll according to the embodiment of the disclosure.
Figure 12:
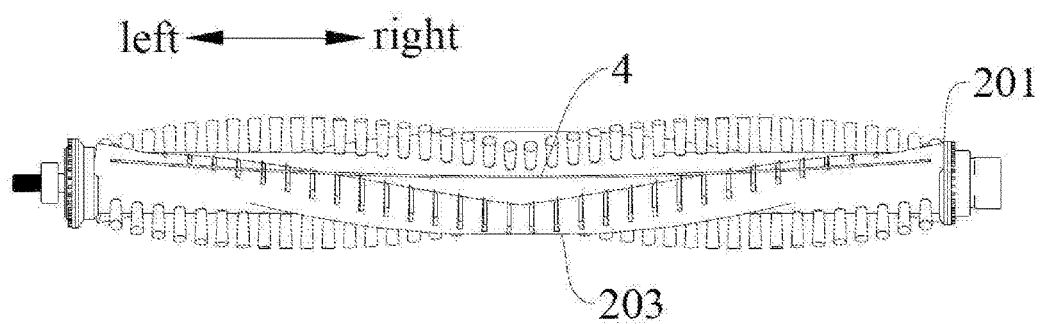
FIG. 12 is another structural schematic view of the blade and the brush roll shown in FIG. 11.

As shown in FIG. 2, FIG. 3 and FIG. 10, the lower surface of the pedal 2 is provided with at least one reinforcing rib 25.

For example, a plurality of reinforcing ribs 25 may be provided and disposed at the lower surface of the pedal 2 at uniform intervals. Accordingly, the strength of the pedal 2 can be effectively guaranteed by providing the reinforcing ribs 25.

Figure 9:
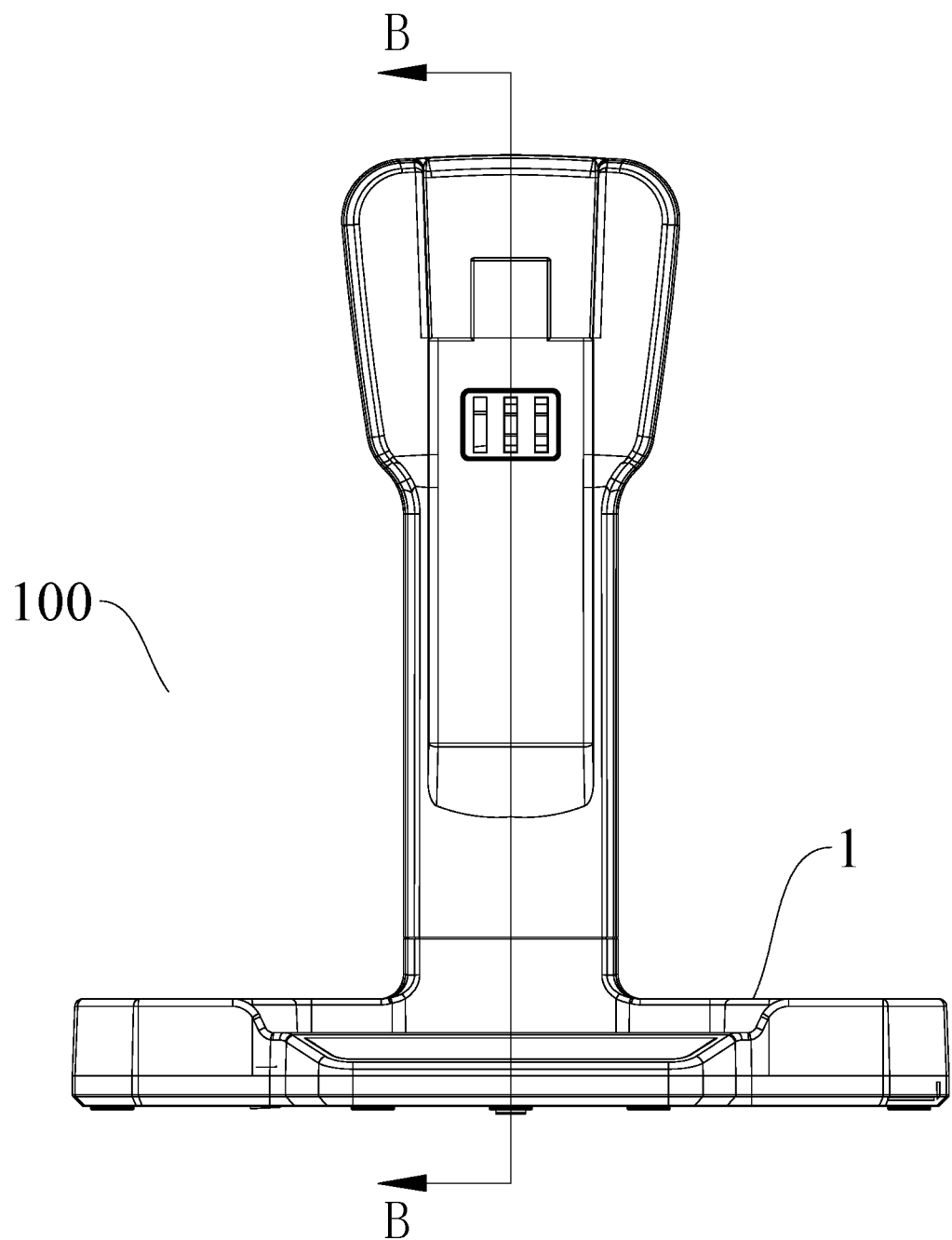
FIG. 9 is a front view of the charging stand for the vacuum cleaner shown in FIG. 7.

According to one embodiment of the present disclosure, the blade 4 is used for cutting off hairs on the brush roll 201 of the vacuum cleaner 200 placed on the pedal 2 when stretching out from the opening 21. Referring to FIG. 9, in combination with FIG. 10, the charging stand 100 further includes a microswitch 5 disposed in the body 1. The microswitch 5 is triggered when the pedal 2 is located at the second position, so as to make the charging stand 100 stop charging and the brush roll 201 rotate.

For example, as shown in FIG. 10, the pedal 2 may be pivotably connected within the body 1 by a pivot 22, and the microswitch 5 is disposed in a rear portion of the charging stand 100 and above the pedal 2. A rear end of the pedal 2 rises up and triggers the microswitch 5 when the pedal 2 is stepped down. Hence, the microswitch 5 can cut off the charging function of the charging stand 100, stop charging the rechargeable vacuum cleaner placed on the pedal 2, and send a signal to the rechargeable vacuum cleaner to make it work. At this moment, the brush roll 201 rotates and the bade 4 cuts the hairs. Herein, it should be noted that, the specific structure and the work principle of the microswitch 5 are known, and will not be described in detail here.

According to one specific embodiment of the present disclosure, as shown in FIG. 2 to FIG. 5, the pedal 2 has a first end and a second end, the first end of the pedal 2 is pivotably connected to the body by the pivot 22, and an elastic resetting member 23 is disposed between the second end of the pedal 2 and the body 1. The elastic resetting member 23 is configured to push the pedal 2 normally in a direction facing the first position. That is to say, the pedal 2 normally remains at the first position. Optionally, the elastic resetting member 23 is a spring.

For example, as shown in FIG. 2 to FIG. 5, the pedal 2 extends in the front and rear direction, the first end of the pedal 2 is a rear end of the pedal 2, and the second end of the pedal 2 is a front end of the pedal 2. The rear end of the pedal 2 is pivotably connected to the body 1 by the pivot 22 extending in the left and right direction. The spring is disposed at the front end of the pedal 2 and between the lower surface of the pedal 2 and a bottom wall of the body 1, and normally pushes the pedal 2 up to maintain the pedal 2 at a horizontal position.

Furthermore, a limiting member 24 is provided at one side, close to the second end of the pedal 2, of the body 1, and located at one side, away from the elastic resetting member 23, of the pedal 2. For example, as shown in FIG. 1 to FIG. 3, the limiting member 24 is a baffle plate, and the baffle plate is disposed at a front side of the body 1 and abuts against the upper surface of the pedal 2 so as to prevent the pedal 2 from rotating upwards further under the effect of the spring.

Figure 4:
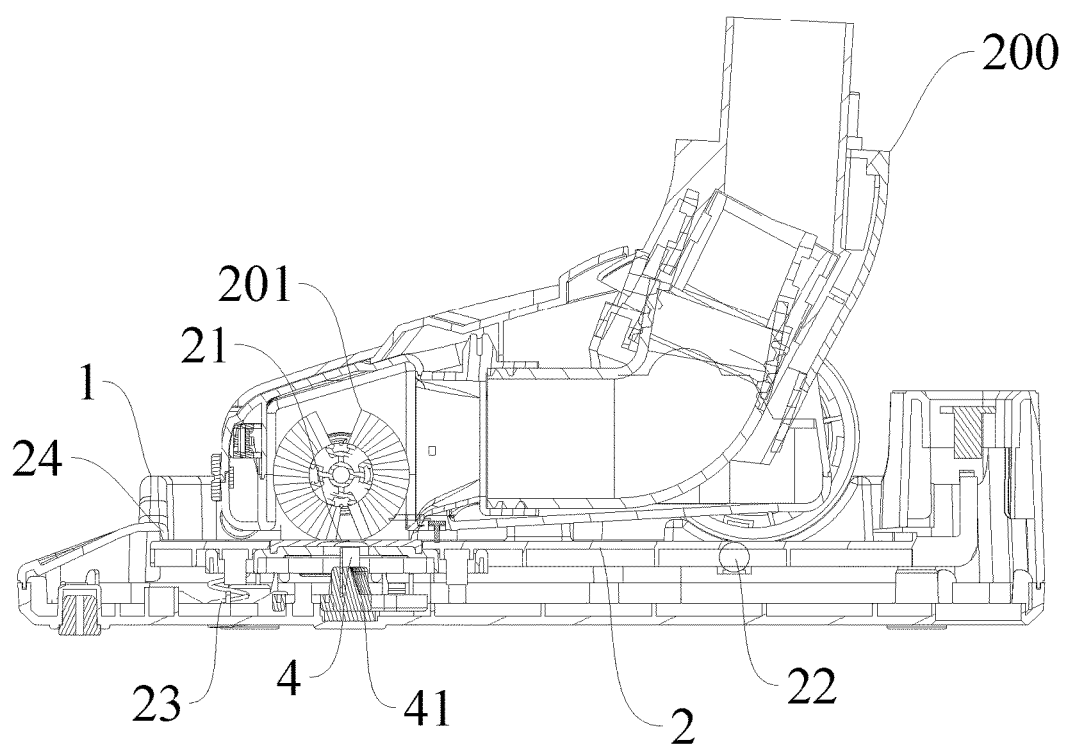
FIG. 4 is a schematic view of a brush roll portion of the vacuum cleaner and the charging stand according to the embodiment of the present disclosure.
Figure 5:
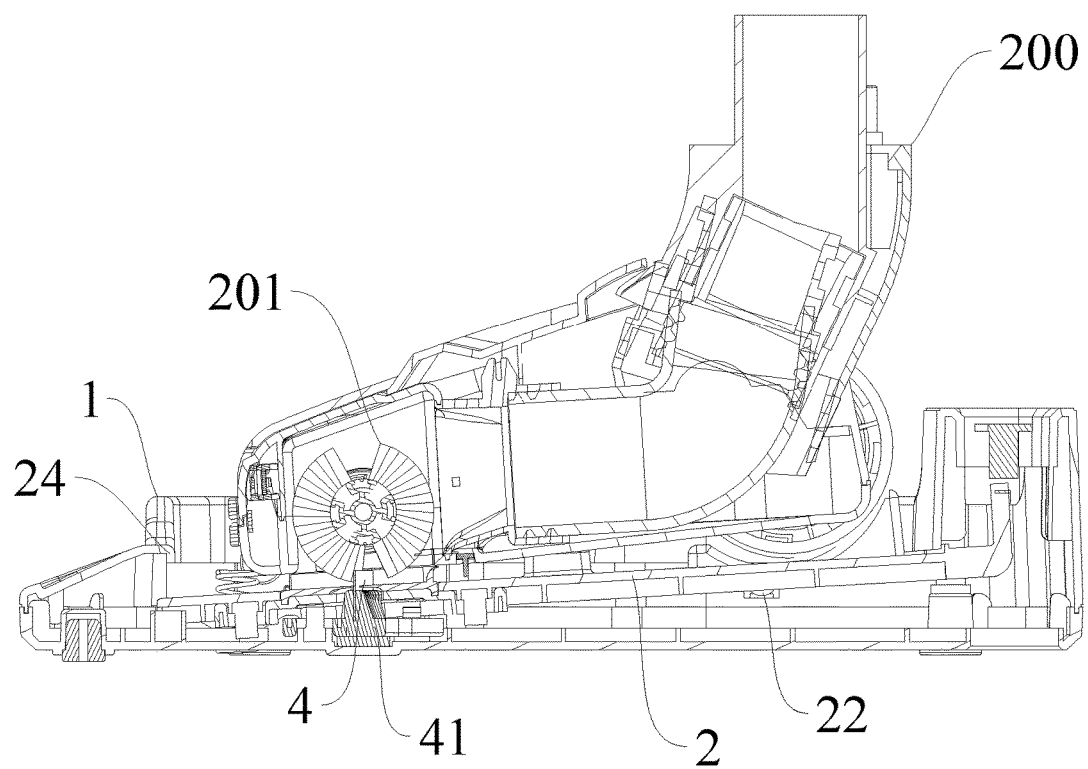
FIG. 5 is another schematic view of the brush roll portion of the vacuum cleaner and the charging stand according to the embodiment of the present disclosure.

As shown in FIG. 4, the rechargeable vacuum cleaner may be directly placed on the pedal 2 of the charging stand 100 to be charged when the rechargeable vacuum cleaner needs charging. When the hairs need cutting, a front portion of the vacuum cleaner 200 may be moved down to drive the front end of the pedal 2 to move downwards after the vacuum cleaner 200 (not limited to the rechargeable vacuum cleaner here) is placed on the pedal 2, so that the blade 4 may stretch into the opening 21 of the pedal 2, and then the vacuum cleaner 200 is started to make the brush roll 201 rotate (e.g. by the above mentioned microswitch) to cut the hairs, as shown in FIG. 5.

Accordingly, the hairs can be automatically cut by providing the above mentioned charging stand 100, and the user may cut the hairs with no need to dismount the brush roll 201, so as to provide great convenience to the user.

According to one specific embodiment of the present disclosure, the top of the body 1 is open, the pedal 2 is disposed within the body 1 and spaced apart from the bottom wall of the body 1, and the upper surface of the pedal 2 is lower than an upper end face of the body 1. A receiving space is defined between the pedal 2 and the body 1, the blade 4, the spring and the like can be placed within the receiving space.

Figure 6:
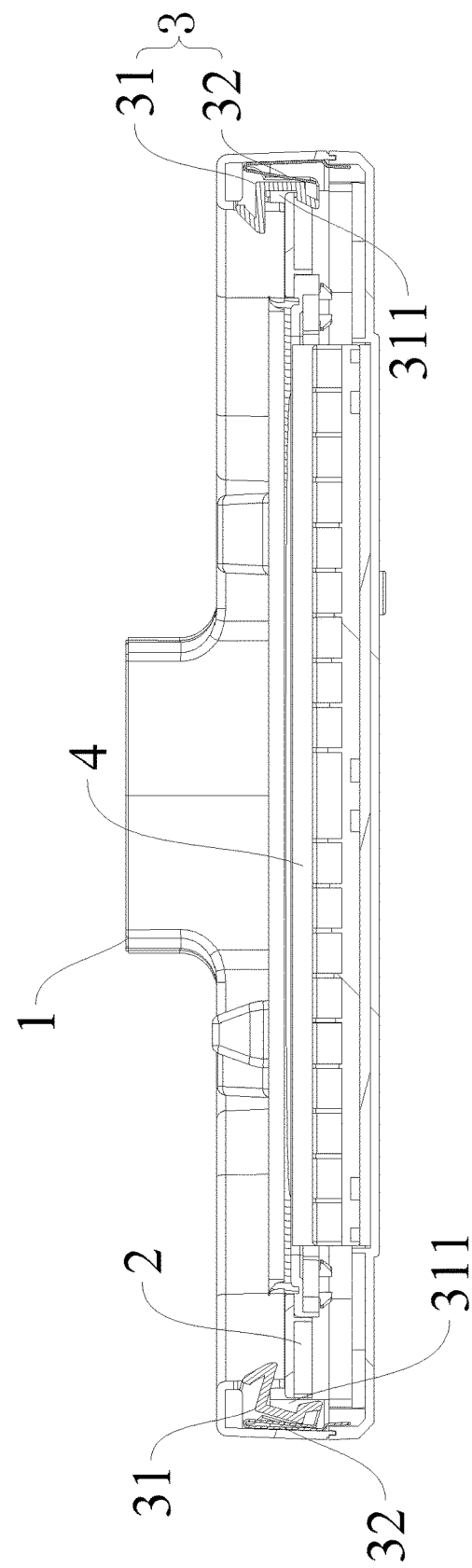
FIG. 6 is a transversal sectional view of the charging stand according to the embodiment of the disclosure, wherein a left safety protection device separates from cooperation with the pedal, and a right safety protection device cooperates with the pedal.
Figure 8:
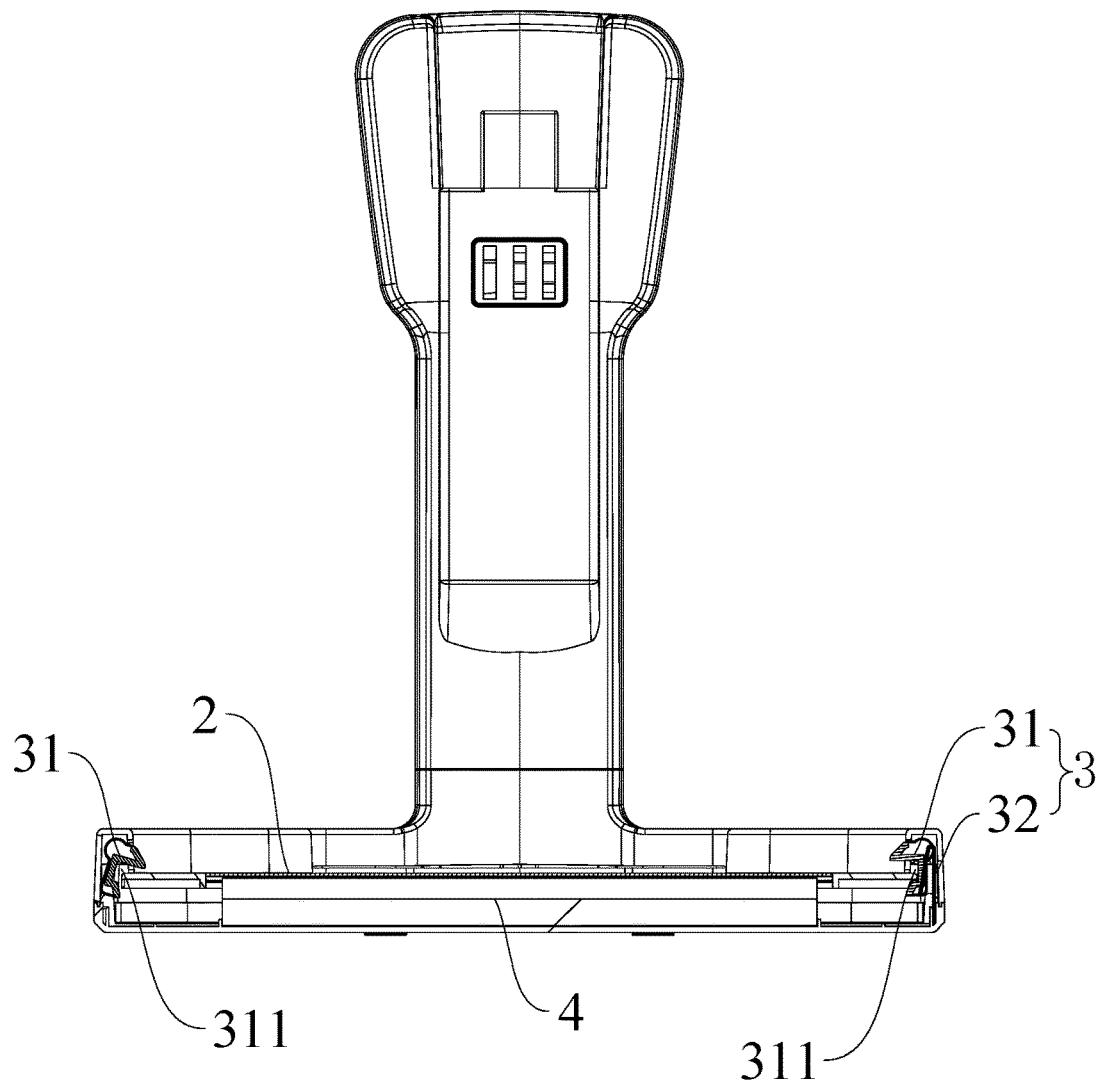
FIG. 8 is a sectional view taken along line A-A in FIG. 7.

According to one embodiment of the present disclosure, as shown in FIG. 6 to FIG. 8, each safety protection device 3 includes: a safety protection member 31 and a resetting member 32. The safety protection member 31 is disposed at a side of the pedal 2 and has a cooperating groove 311 for cooperating with an edge of the pedal 2. The resetting member 32 is disposed between the safety protection member 31 and the body 1, and configured to normally push the safety protection member 31 in a direction facing the center of the pedal 2. Optionally, the resetting member 32 is a resilient sheet or a spring. Accordingly, the cooperating groove 311 of the safety protection member 31 may cooperate with the edge of the pedal 2 to prevent the pedal 2 from moving to the second position and thus prevent the blade 4 from being exposed. Also, by disposing the resetting member 32, the safety protection member 31 may make the cooperating groove 311 cooperate with the edge of the pedal 2 under the effect of the resetting member 32 when no external force is applied to the safety protection member 31, so as to provide a safety protection function.

As shown in FIG. 6, the safety protection member 31 is pivotably connected to the body 1. The safety protection member 31 has a first end (e.g. an upper end shown in FIG. 6) and a second end (e.g. a lower end shown in FIG. 6), in which the cooperating groove 311 is formed at the second end of the safety protection member 31. The second end of the safety protection member moves towards a direction away from the center of the pedal 2 when the first end of the safety protection member is moved, to make the edge of the pedal 2 separate from cooperation with the cooperating groove 311.

For example, the safety protection member 31 is usually disposed vertically. One side, facing the center of the pedal 2, of the cooperating groove 311 is open and cooperates with the edge of the pedal 2, in which case, as the edge of the pedal 2 abuts against an internal wall of the cooperating groove 311, the pedal 2 cannot move to the second position if the pedal 2 is stepped down, and the blade 4 cannot stretch out from the opening 21, so as to improve the safety. When the hairs need cutting, for example, the first end of the safety protection member 31 may be moved down, the cooperating groove 311 at the second end of the safety protection member 31 moves towards a direction away from the center of the pedal 2 and separates from the pedal 2. Hence, the pedal 2 can moves to the second position to make the blade 4 stretch out from the opening 21 to cut the hairs, when stepped down.

As shown in FIG. 6, the first end of the safety protection member 31 stretches out from the internal side surface of the body 1 and is located above the pedal 2, when the pedal 2 is located at the first position. Accordingly, the first end of the safety protection member 31 can be conveniently moved.

Furthermore, the first end of the safety protection member 31 has a guide face for pressing the first end of the safety protection member 31. Optionally, the guide face is configured to obliquely extend from the top down and towards the center of the pedal 2. For example, the guide face is formed as an inclined plane or an inclined curved surface that obliquely extends from the top down and towards the center of the pedal 2. Accordingly, a side of the vacuum cleaner 200 may press the first end of the safety protection member 31 down along the guide face to make the pedal 2 separate from cooperation with the safety protection member 31, when the vacuum cleaner 200 is put into the charging stand 100 from the top down.

As shown in FIG. 7, two safety protection devices 3 are provided, and the two safety protection devices 3 are arranged at a left side and a right side of the body 1, respectively. Accordingly, by providing the two safety protection devices 3, the blade 4 can stretch out from the interior of the charging stand 100, only when the two safety protection devices 3 are pushed at the same time and the pedal 2 is stepped down.

Here is illustrated by an example of two safety protection devices 3. The safety protection members 31 of the two safety protection devices 3 cooperate with the edge of the pedal 2 under the effect of the resetting member 32, when the charging stand 100 is not used for charging. The pedal 2 cannot move to the second position even though the pedal 2 is stepped down, so the blade 4 cannot stretch out from the opening 21. Also, the pedal 2 cannot move to the second position either, when only one safety protection device 3 is pushed and the safety protection device 3 separates from cooperation with the edge of the pedal 2, because the other safety protection device 3 still cooperates with the edge of the pedal 2, so as to guarantee the safety of the charging stand 100. When the rechargeable vacuum cleaner needs charging or the hairs at the vacuum cleaner 200 need cutting, the vacuum cleaner 200 may be placed onto the charging stand 100. The vacuum cleaner 200 may press the safety protection members 31 of the two safety protection devices 3 to make the safety protection members 31 separate from the pedal 2 during the above process, and the rechargeable vacuum cleaner can be charged. The blade 4 stretches out from the opening 21 of the pedal 2 to cut the hairs, if the pedal 2 is stepped down and moved to the second position.

Accordingly, the safety hazard caused by accident trigger can be prevented when not in charging, by providing the above mentioned safety protection devices 3.

For the charging stand 100 according to embodiments of the present disclosure, the function of the charging stand 100 is expanded, and the safety of using the charging stand 100 is improved.

Other structures and operations of the charging stand 100 according to embodiments of the present disclosure are known to those skilled in the art, and thus will not be described in detail here.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure. The scope of the present disclosure is defined by claims and equivalents thereof.

What is claimed is:

1. A charging stand for a vacuum cleaner, comprising:
a body;
a pedal, disposed to the body and pivotable between a first position and a second position;
and
a safety protection device disposed to the body, wherein the safety protection device contacts the pedal in the first position when the safety protection device is not activated; when the safety protection device is activated, the safety protection device separates from the pedal, and the pedal moves from the first position to the second position.

2. The charging stand according to claim 1, wherein at least two safety protection devices are provided, the at least two safety protection devices are disposed to the body and spaced apart from one another, and the at least two safety protection devices separate from the cooperation with the pedal to make the pedal move from the first position to the second position when moved.

3. The charging stand according to claim 1, wherein the safety protection device comprises:
a safety protection member, disposed at a side of the pedal and having a cooperating groove for cooperating with an edge of the pedal; and
a resetting member, disposed between the safety protection member and the body, and configured to push the safety protection member in a direction facing the center of the pedal.

4. The charging stand according to claim 3, wherein the safety protection member is pivotably connected to the body, and has a first end and a second end, the cooperating groove being formed in the second end of the safety protection member,
wherein the second end of the safety protection member moves towards a direction away
from the center of the pedal when the first end of the safety protection member is moved, to make the edge of the pedal separate from cooperation with the cooperating groove.

5. The charging stand according to claim 4, wherein the first end of the safety protection member has a guide face for pressing the first end of the safety protection member.

6. The charging stand according to claim 5, wherein the guide face is configured to obliquely extend from the top down and towards the center of the pedal.

7. The charging stand according to claim 4, wherein the first end of the safety protection member stretches out from an internal side surface of the body when the pedal is located at the first position.

8. The charging stand according to claim 3, wherein the resetting member is a resilient sheet or a spring.

9. The charging stand according to claim 1, wherein two safety protection devices are provided and located at a left side and a right side of the body, respectively.

10. The charging stand according to claim 1, wherein the pedal is horizontally disposed when located at the first position.

11. The charging stand according to claim 1, wherein α represents a rotation angle of the pedal rotating from the first position to the second position, wherein α satisfies 0 degree<α≤60 degrees.

12. The charging stand according to claim 11, wherein α further satisfies 1 degree≤α≤10 degrees.

13. The charging stand according to claim 1, wherein the body has an open top, and the pedal is disposed within the body and spaced apart from a bottom wall of the body.

14. The charging stand according to claim 1, wherein a blade is disposed within the body, and the pedal has an opening formed in a position corresponding to the blade;

when the pedal is located at the second position, the blade stretches out from the opening to cut off hairs on a brush roll in the vacuum cleaner placed on the pedal, and the blade is located under the opening when the pedal is located at the first position.

15. The charging stand according to claim 14, further comprising:

a microswitch, disposed within the body, and triggered when the pedal is located at the second position to make the charging stand stop charging and the brush roll rotate.

16. The charging stand according to claim 14, wherein the blade extends in a curve way along a length direction of the blade.

17. The charging stand according to claim 14, wherein the body has a base, and an elastic member is disposed between the blade and the base.

18. The charging stand according to claim 17, further comprising:

a blade holder, disposed to the base, wherein the blade is disposed on the blade holder, and the elastic member is disposed between the blade and the blade holder and/or between the blade holder and the base.

19. The charging stand according to claim 18, wherein a receiving groove used for receiving the elastic member is formed in the base when the elastic member is disposed between the blade holder and the base.

20. The charging stand according to claim 19, wherein an upper surface of the elastic member is higher than an upper surface of the base.

21. The charging stand according to claim 14, wherein the pedal is provided with a baffle sheet, and the opening is formed in the baffle sheet.

22. The charging stand according to claim 21, wherein the baffle sheet is horizontally disposed.

23. The charging stand according to claim 21, wherein a clearance groove is formed in a lower surface of a portion, close to the opening, of the baffle sheet.

24. The charging stand according to claim 23, wherein an internal wall of the clearance groove is configured to have a distance from an upper surface of the baffle sheet decreased gradually in a direction facing the opening.

25. The charging stand according to claim 1, wherein the pedal has a first end and a second end, and the first end of the pedal is pivotably connected to the body by a pivot;

an elastic resetting member is disposed between the second end of the pedal and the body, and configured to push the pedal in a direction facing the first position.

26. The charging stand according to claim 25, wherein a limiting member is provided at a side, close to the second end of the pedal, of the body, and the limiting member is located at a side, away from the elastic resetting member, of the pedal.

* * * * *